(12) United States Patent
Vasko (10) Patent No.: US 11,625,024 B2
(45) Date of Patent: Apr. 11, 2023

(54) LOCKOUT, TAGOUT AUDIT SYSTEM

(71) Applicant: Rockwell Automation Technologies, Inc., Mayfield Heights, OH (US)

(72) Inventor: David A. Vasko, Hartland, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 662 days.

(21) Appl. No.: 16/711,670

(22) Filed: Dec. 12, 2019

(65) Prior Publication Data

US 2021/0181719 A1    Jun. 17, 2021

(51) Int. Cl.
*G05B 19/418*     (2006.01)
*G07C 9/00*       (2020.01)
*G06F 16/51*      (2019.01)

(52) U.S. Cl.
CPC ......... *G05B 19/4183* (2013.01); *G06F 16/51* (2019.01); *G07C 9/00896* (2013.01)

(58) Field of Classification Search
CPC ... G05B 19/4183; G06F 16/51; G06F 16/583; G07C 9/00896; Y02P 90/02
See application file for complete search history.

(56) References Cited

U.S. PATENT DOCUMENTS 10,614,646 B1 *   4/2020   Douglass ............... H01H 9/281
2008/0203158 A1 * 8/2008   Wieser ................... G08B 21/24
                                                        235/385

* cited by examiner

*Primary Examiner* — Matthew Mikels
(74) *Attorney, Agent, or Firm* — Boyle Fredrickson, SC (57) ABSTRACT

A lockout tagout auditing and guidance system provides a mobile device that can guide an individual to particular tags either to perform the operations required for lockout procedures or to perform an auditing activity. In both cases, images of the tags are obtained and imaged and tag locations compared to corresponding information in the database to assess the existence and clarity of the tags for auditing purposes.

21 Claims, 5 Drawing Sheets

LOCKOUT, TAGOUT AUDIT SYSTEM

STATEMENT REGARDING FEDERALLY SPONSORED RESEARCH OR DEVELOPMENT

- - -

CROSS REFERENCE TO RELATED APPLICATION

- - -

BACKGROUND OF THE INVENTION

The present invention relates to lockout tags which describe procedures for safe repair or service of machinery and in particular to a system for auditing lockout tags and providing guidance for their use.

Lockout, tagout (LOTO) refers to a set of practices to help ensure that dangerous machinery is not activated when that machinery is being serviced or repaired. A simple example LOTO procedure provides each of multiple service personnel with padlocks that can be applied to a mechanical lockout device (for example, a cabinet door) controlling access to a power switch for the machinery being serviced or repaired. Before working on the machinery, each service person applies his or her padlock to this lockout device, performs the service or repair operation, and then removes the padlock—but only after he or she has completed any necessary work. In this way, only when all service personnel have removed their padlocks and are away from danger can the power switch be activated and the machine turned on.

A machine that has been locked in this manner may have a tag attached to it indicating that the machine is under service and the locks are not to be disturbed. Sometimes, in special cases, tags are used without a lockout device, providing a "tag out" but not a "lockout" of the machine.

In more complex LOTO procedures, multiple steps may be required to ensure the safety of service personnel. For example, consider an electric pump communicating with a pipe connected to a reservoir. Safe servicing of the pump requires removal of electrical power from the pump (for example, using a power switch and lockout device as discussed above) but also requires shutting valves leading to the reservoir so as to prevent the stored energy of the reservoir from being released if the pump is removed. Similar situations can occur when the particular machines being serviced are interconnected with other machines, for example, in an assembly line. In this case the machine being serviced and these other machines must all be shut down before any work.

These more complex LOTO procedures employ "lockout tags" that remain in place on the machinery and guide a user in performing the LOTO procedure when needed. These lockout tags include "procedure tags" that are positioned at a primary location being serviced (for example, on the pump in the above example) and one or more auxiliary or "task tags" referred to by the procedure tag. These task tags mark locations where lockout tasks described by the procedure tag need to be performed (for example, on pipe shut off, described above, or power control switches for other machines). Henceforth these procedure tags and task tags types will be referred to collectively as lockout tags and should be distinguished from the tags that are put up episodically during service procedures.

It is important that the lockout tags be properly positioned and maintained. This can be accomplished through an auditing process where an individual physically visits each machine and confirms proper location of each lockout tag, recording these location and tags on a form or portable computer tablet or the like.

Such auditing is costly and can be prone to mistakes. An auditor may not notice that a properly located procedure tag is partially obscured, damaged, or obsolete. Task tags can be difficult to find, or in the wrong position, or when in the correct position have the wrong identification number requiring a high degree of vigilance by the auditor.

SUMMARY OF THE INVENTION

The present invention provides a computer-driven, image-based confirmation of lockout tags allowing automatic and rapid identification of lockout tags that are incorrect, damaged, or obsolete. In some embodiments, the invention also confirms the proper location of the tags. The invention contemplates capturing information not only during an audit but also during lockout procedures reducing the need for later separate auditing. During lockout procedures, the system can facilitate locating the tags and executing the lockout procedure.

Specifically, then, in one embodiment, the invention provides an apparatus for lockout tag confirmation having a mobile unit adapted for portable operation by a user, the mobile unit holding a camera and having an electronic computer holding a database linking lockout tags to audit information. The electronic computer communicates with the mobile unit and executes a program stored in electronic computer memory to: (a) receive a camera image of a given lockout tag from the camera and compare data of the camera image to database data to determine a matching value indicating a matching between the camera image and the database data; and (b) after determining the matching value, update the audit information of the database linked to the database data to indicate an auditing of the given lockout tag.

It is thus a feature of at least one embodiment of the invention to provide an improved system for auditing the lockout tag information by enlisting a machine comparison between tag information in a database and actual tag images during auditing.

The audit information may indicate a date of the updating of the audit information.

It is thus a feature of at least one embodiment of the invention to provide a system that can simplify a regular auditing of lockout tags.

The comparison may determine a multivalued matching value indicating each and any of a likely erroneous lockout tag, a likely correct lockout tag, and a likely correct lockout tag that is partially obscured and needs replacement.

It is thus a feature of at least one embodiment of the invention to provide an auditing system that can help anticipate a need to replace lockout tags and possible future mistakes.

The mobile device may include a means for sensing location of the camera image, and the database may include location information with respect to the lockout tags. In this embodiment the electronic computer provides audit information capturing whether a location of the given lockout tag in the camera image deviates by more than a predetermined amount from the location information in the database matching the given lockout tag.

It is thus a feature of at least one embodiment of the invention to ensure not only the correctness of the lockout tags but their correct position on the machinery such as may help detect whether lockout tags have been moved away from their assigned locations, for example, by being dislodged and incorrectly replaced or otherwise moved.

The electronic computer may further output information that indicates a matching of the given lockout tag with a lockout tag in a different location but associated with the machine group of the given lockout tag.

It is thus a feature of at least one embodiment of the invention to guard against difficult to detect errors where the correct tags are on the machines but their positions have been swapped such as can lead to errors in implementing the lockout procedure. It is a further object of the invention to assist the user in correcting these errors by identifying proper tag location.

The mobile device may provide a checklist display indicating lockout tags associated with a given machine and showing lockout tags which have been processed, that is where a camera image has been received for determining a matching value.

It is thus a feature of at least one embodiment of the invention to provide a system that can help guide a user through a complete auditing of the lockout tags for a machine by automatically indicating tags that have been audited.

The mobile device may provide a user input that a given lockout tag on the checklist is missing, and the audit information may be updated to indicate that the given lockout tag is missing.

It is thus a feature of at least one embodiment of the invention to allow the user to affirmatively indicate that a tag is missing and image capture is thus impossible.

The mobile device may provide a display, and the electronic computer may output to the user on the display the results of the matching.

It is thus a feature of at least one embodiment of the invention to permit immediate corrective action to be taken in some situations (for example, incorrect tag location) and during lockout procedures to provide a way of correcting for incorrect tag location or information.

In some embodiments, the electronic computer may operate to display the image of the machine environment with markings in the image indicating a location of the given lockout tag in the image.

It is thus a feature of at least one embodiment of the invention to efficiently guide the individual, during either an auditing process or a lockout process, to the necessary lockout tags. It is another object of the invention to promote use of the apparatus during lockout so that the apparatus can concurrently perform auditing functions.

The database may hold data distinguishing between the procedure tags providing instructions for a lockout procedure referencing other task tags and the task tags; and the markings may visually distinguish between the procedure tag and the task tags It is thus a feature of at least one embodiment of the invention to permit the user to quickly locate the procedure tag during lockout procedures and to allow special treatment of the procedure tag with respect to display and analysis.

The means for sensing location of the camera image may extract location information from a camera image of a fiducial marker fixed with respect to a machine associated with lockout tags of the database.

It is thus a feature of at least one embodiment of the invention to provide a robust and simple method of obtaining location information well adapted for a factory environment.

The fiducial marker may further identify the machine associated with the fiducial marker which may be used to index the database.

It is thus a feature of at least one embodiment of the invention to provide a method of windowing the database to ensure analysis of the correct lockout tags and to minimize the computational overhead.

The fiducial marker may be a QR code.

It is thus a feature of at least one embodiment of the invention to make use of a robust technology with an established ability to provide information transfer as well as relative camera location information.

When the lockout tag is a procedure tag, the predetermined matching may indicate a nonmatching when at least one word of the instructions is different.

It is thus a feature of at least one embodiment of the invention to provide a system that can check for procedure version errors that might be overlooked during a manual auditing.

The apparatus may operate so that when the camera image is an image of a lockout procedure tag referencing other lockout tags, it displays a checklist indicating steps of the instructions, receiving user input to check off those steps, and indicating when all of the steps have been checked off by the user.

It is thus a feature of at least one embodiment of the invention to permit the instructions of the procedure tag to follow the user as he or she moves through the lockout procedure steps, and thus provide an opportunity for concurrent auditing of the lockout tags during lockout procedures.

The mobile device may display the database data of the procedure tag together with the camera image for comparison by the user.

It is thus a feature of at least one embodiment of the invention to permit manual comparison of database information and tag information to allow overriding or reassessment of match determinations so as to reduce the possibility of false positive errors and allow critical lockout operations to be unencumbered when lockout can be safely conducted. It is another object of the invention to permit the user to make use of the database data when the procedure tag is damaged, again allowing critical lockout operations to proceed.

The step of comparing data of the camera image to data of a database data may perform optical character recognition on the camera image to compare characters of the camera image to character string database data.

It is thus a feature of at least one embodiment of the invention to provide extremely precise analysis of the correctness of lockout procedure tags.

The step of comparing data of the camera image to the database data may compare a correlation between pixels of the camera image and pixels of an image of the database data corrected for positional and rotational differences between these images.

It is thus a feature of at least one embodiment of the invention to provide an analysis that can reveal matching of arbitrary symbols as well as additional variations in degradation of the lockout tags.

The mobile device may receive an input from the operator to annotate the predetermined matching value which can be incorporated into the audit information.

It is thus a feature of at least one embodiment of the invention to provide a conduit for useful information from the auditor to those that may be involved in taking remedial actions when those individuals are different.

The electronic computer may further operate to output a report identifying lockout tags that have not had received camera images of a given lockout tag within a predetermined time limit of a previously received camera image for the given lockout tag.

It is thus a feature of at least one embodiment of the invention to provide an audit reminder system that can be driven by real-time audit data.

The report may distinguish between categories of missing lockout tags, lockout tags with erroneous data, and lockout tags that need to be replaced but have correct data.

It is thus a feature of at least one embodiment of the invention to provide an audit report that allows preemptive maintenance of lockout tags to avoid lockout downtime.

These particular objects and advantages may apply to only some embodiments falling within the claims and thus do not define the scope of the invention.

DETAILED DESCRIPTION OF THE PREFERRED EMBODIMENT

Figure 1:
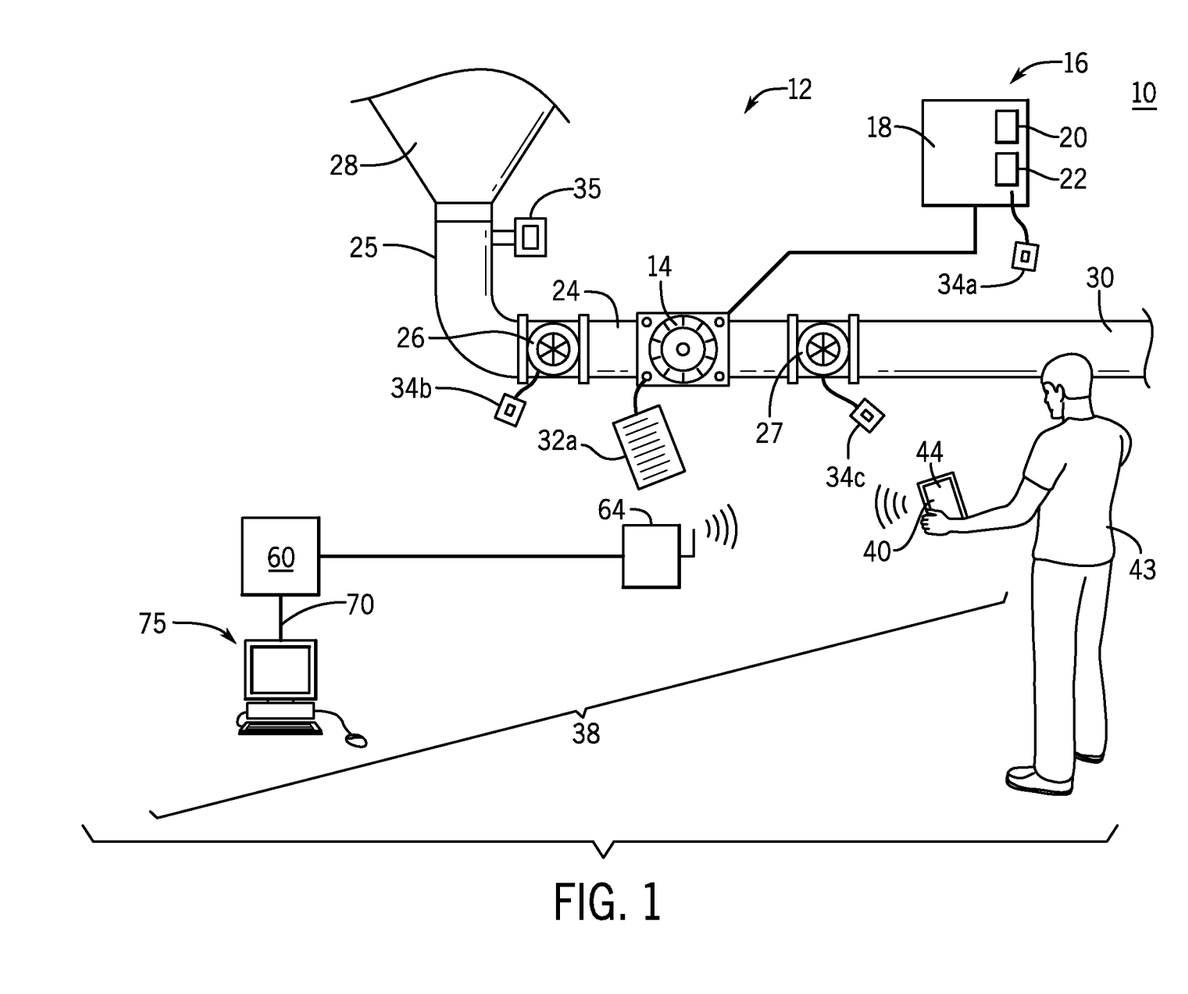
FIG. 1 is a perspective view of an example machine having lockout tags and showing the principal elements of the present invention including a mobile device for viewing the machine communicating with an electronic computer system for analyzing lockout tags.

Referring now to FIG. 1, an industrial environment 10, such as a factory or the like, may provide manufacturing equipment 12, in this example, a machine or system incorporating an electric fluid pump 14. The pump 14 may receive power from a breaker cabinet 16 providing internal circuit breakers (not shown) accessible through a door 18 having a hasp 20 that may be locked with one or more padlocks 22. During operation, the fluid pump 14 may pump a liquid upward and against the pressure head through an outflow pipe 24, shut off valve 26, and riser 25 into a tank 28. Liquid received by the fluid pump 14 may pass through an inflow pipe 30 passing through a valve 27 before being received by the pump 14.

Servicing of the pump 14 may require its removal which in turn may require turning off electrical power received by the pump 14 through the breaker cabinet 16, blocking the stored energy of the water in the tank 28 by shutting shut off valve 26, and blocking inflow water by shutting valve 27.

An example LOTO process for the fluid pump 14 is orchestrated by a procedure tag 32 placed on the pump 14. The procedure tag 32 provides written instructions as to the proper steps for safely repairing or working on the fluid pump 14 and in that regard may refer variously to task tag 34a on the breaker cabinet 16, task tag 34b on shut off valve 27, and task tag 34c on shut off valve 27 and provides instructions about tasks that should be performed at the devices attached to each of these task tags 34. Collectively the procedure tag 32 and one or more task tags 34 will be termed lockout tags.

Referring still to FIG. 1, present invention may also provide a fiducial marker 35 attached at a known fixed location on the manufacturing equipment 12. This fiducial marker 35 provides visual indicium that uniquely identifies the manufacturing equipment 12, for example, with a unique machine number. In one embodiment, the fiducial marker 35 will also allow orientation (range and angle) between the manufacturing equipment 12 and the mobile device 40 to be determined as will be discussed in greater detail below.

Figure 2:
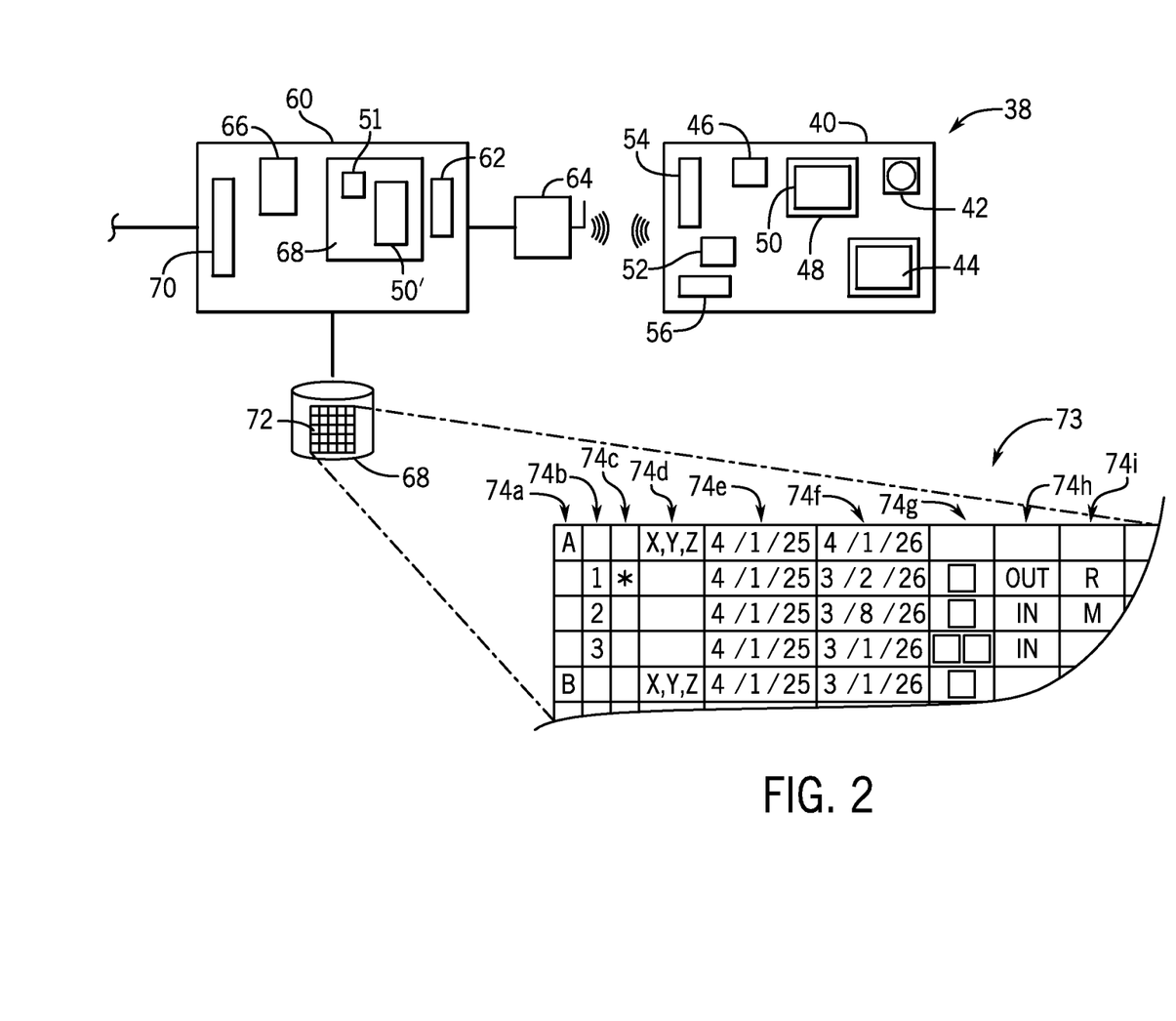
FIG. 2 is a block diagram of the mobile system and electronic computer system showing a database managed by the electronic computer system providing for lockout tag information including location and image file and audit data.

Referring now also to FIG. 2, a lockout tag confirmation apparatus 38 constructed according to one embodiment of the present invention may include a mobile device 40 adaptable to be carried by a user 43 working with the manufacturing equipment 12. The mobile device 40 includes a camera 42 that may be directed to encompass within its field of view various pieces of manufacturing equipment 12 and their lockout tags 32 and 34, either in a single image or by movement of the camera 42 by the user 43. Images captured by the camera 42 may be displayed on a touchscreen display 44 of the mobile device 40 to the user 43 and data may be entered by the user 43 through the touchscreen display 44.

Suitable mobile devices 40 may be constructed specifically for this purpose according to well-known procedures or may make use of commercial off-the-shelf (COTS) devices, for example, a tablet computer, a laptop computer, augmented reality or virtual reality goggles, or a cell phone or the like.

The mobile device 40 may include a processor 46 communicating with a computer memory 48 holding a stored program 50 as will be described further below with respect to the discussion of FIG. 3. Generally, the mobile device 40 may also include one or more sensors 52 including a GPS receiver, accelerometers, a gyroscope, and/or a compass each of which can be used in determining the location of the mobile device 40 and its orientation. In addition, the mobile device 40 may include a wireless transceiver 54 and a battery 56 allowing ready portability by a user 43 conducting an audit or a lockout procedure.

In addition to the mobile device 40, the lockout tag confirmation apparatus 38 may also include an electronic computer 60, for example, such as may be stationary while communicating with the mobile device 40 through a port 62 connected with a wireless transceiver 64 receiving radio signals from the mobile device 40. The wireless transceiver 64 may be of conventional design, for example, conforming to the WIFI standards.

Like the mobile device 40, the electronic computer 60 may include one or more processors 66 and electronic memory 68 holding a stored program 50' operating in conjunction with program 50. The electronic computer 60 may also include an interface 70 communicating with remote terminals 75, for example, having a keyboard or other user input device and a display and thereby providing a human-machine interface, and the interface 70 and remote terminals 75 may be connected directly by dedicated communication link or via the Internet, for example, over a dedicated communication link or via the Internet. The electronic computer 60 and electronic memory 68 may implement a database 72 using a database management program 51 of a type known in the art.

The database 72 will logically present a table 73 arranging information about the various procedure tags 32 and task tags 34 according to particular manufacturing equipment 12. Here the table 73 is depicted as a set of rows, each row associated with a particular piece of manufacturing equipment 12 and collecting in subsequent rows the procedure tags 32 and task tags 34 of that particular piece of manufacturing equipment 12. Each of the rows provides various attributes of the particular piece of manufacturing equipment 12 or its procedure tags 32 and task tags 34 arranged in fields represented by columns. It will be appreciated that this is a logical representation and the actual database may be structured differently.

Referring still to FIG. 2, a first field 74a of the database 72 may provide unique identifiers for different manufacturing equipment 12 subject to lockout tagout in the industrial environment 10, for example, the rows identified by a unique ordinal number attribute which can be used for indexing. The second set of rows arranges the task procedure tags 32 and task tags 34 associated with that manufacturing equipment 12 hierarchically underneath the associated manufacturing equipment 12 and provides a second field 74b uniquely identifying those task procedure tags 32 and task tags 34 with respect to the manufacturing equipment 12 again, for example, by an ordinal number unique to that tag/machine combination. A field 74c may flag one of these tag rows as representing a procedure tag 32.

A fourth field 74d provides, for each piece of manufacturing equipment 12, a coarse location within the industrial environment 10 that may be used to guide an individual among different pieces of manufacturing equipment 12. Importantly, this field also provides locations of each of the lockout tags relative to the fiducial marker 35 on the piece of manufacturing equipment 12, for example, expressed as coordinates in three orthogonal Cartesian dimensions.

A fifth and sixth field 74e and 74f provide an audit due date and most recent audit date, respectively, for the given lockout tags. The audit due date may be a predetermined period of time after the previous date of auditing, for example, 6 months, and provides a schedule that allows automatic reminders that an audit is required.

Also associated with each lockout tag, per field 74g is a reference image of that tag showing a front reading surface of the tag such as exhibits instructions for procedure tags 32 or an identifying number or letter combination for a task tag 34. These reference images of field 74g generally capture a pristine view of the front reading surface of the lockout tag before deployment to the industrial environment 10 and are regularly updated to provide the latest tag information during a commissioning process. For procedure tags 32, field 74g may also provide a reference text file corresponding to the reference image.

A next field 74h allows recording of lockout or lockout retraction events as will be discussed below, and a final field 74i provides an ability to record the quality or state of the tag.

Figure 3:
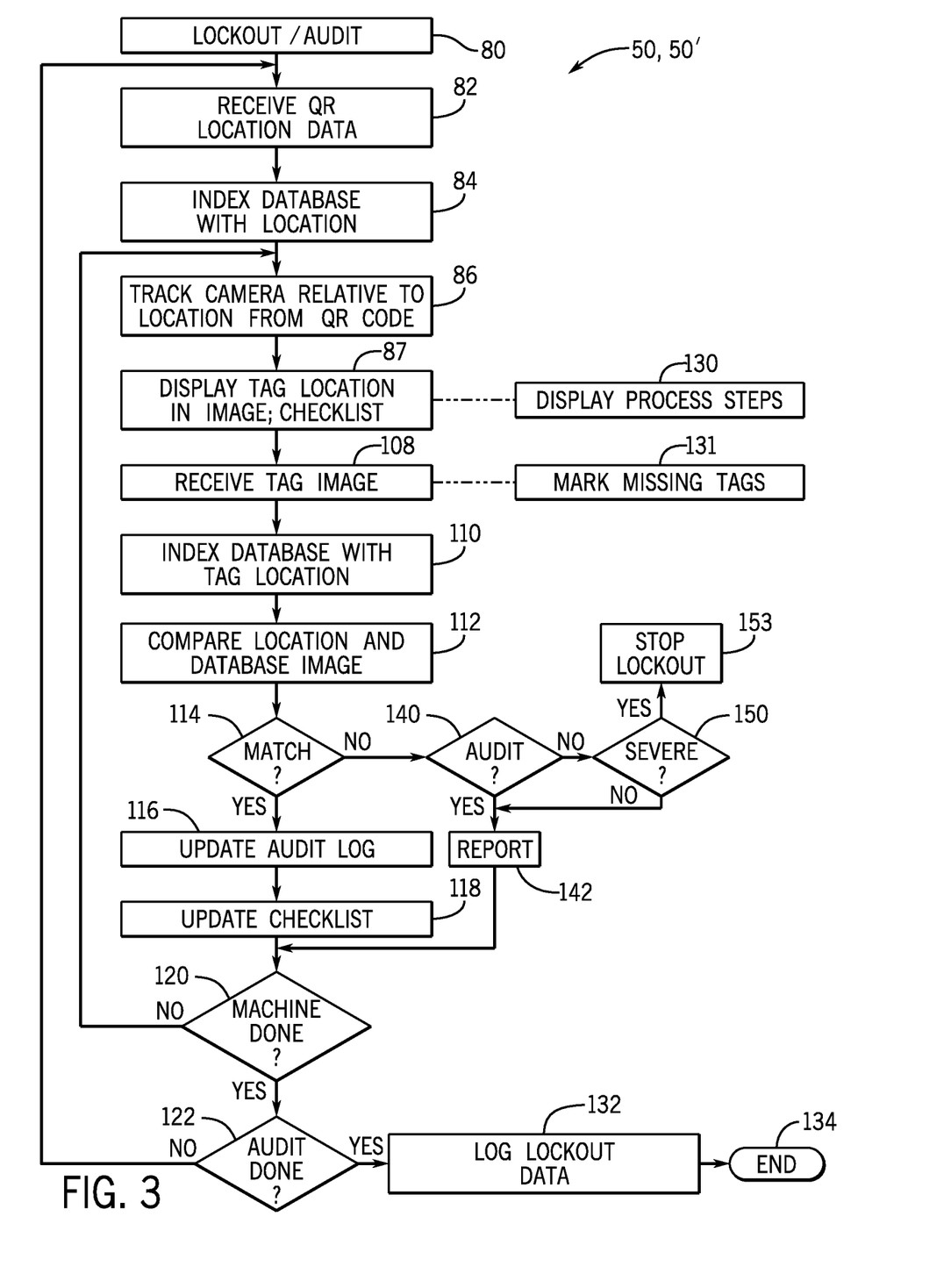
FIG. 3 is a flowchart of a program executed jointly or individually by the mobile device and electronic computer of FIG. 1 showing the steps of auditing and/or implementing a lockout as may be facilitated by the present invention.

Referring now to FIGS. 1, 2, and 3, programs 50 and 50' (henceforth referred to collectively as program 50) may operate together to implement a series of steps for either auditing or implementing a lockout procedure. As will be discussed below, when the program 50 is employed for implementing a lockout procedure, it may also perform some auditing tasks in the background.

This choice between auditing or implementing a lockout is selected by the user 43 at the time of the running of the program 50 per process block 80, for example, through a touchscreen input on the display of the mobile device 40. When the user 43 indicates that a lockout task is being performed, the user 43 may also identify whether the piece of manufacturing equipment 12 is being locked or unlocked as part of the lockout procedure. This information will be recorded in field 74h.

At process block 82 of program 50, the user 43 is instructed to obtain a close-up image of the fiducial marker 35 to allow a printed QR (quick response) code on a face of the fiducial marker 35 to be decoded. This decoded number can be used to index the database 72 using the field 74a. For example, the QR code may indicate that the particular equipment is "machine A" thus providing an index in the database 72 for that piece of manufacturing equipment 12 that can identify its associated procedure tags 32 and task tags 34. This indexing process is indicated by process block 84.

At process block 86 the user 43 is instructed to withdraw the camera 42 of the mobile device 40 back away from the fiducial marker 35 to obtain an image of different portions of the manufacturing equipment 12. During that movement, the camera 42 and internal sensors of the mobile device 40 are used to track the relative position of the mobile device 40 with respect to the fiducial marker 35 and thus the manufacturing equipment 12.

Figure 7:
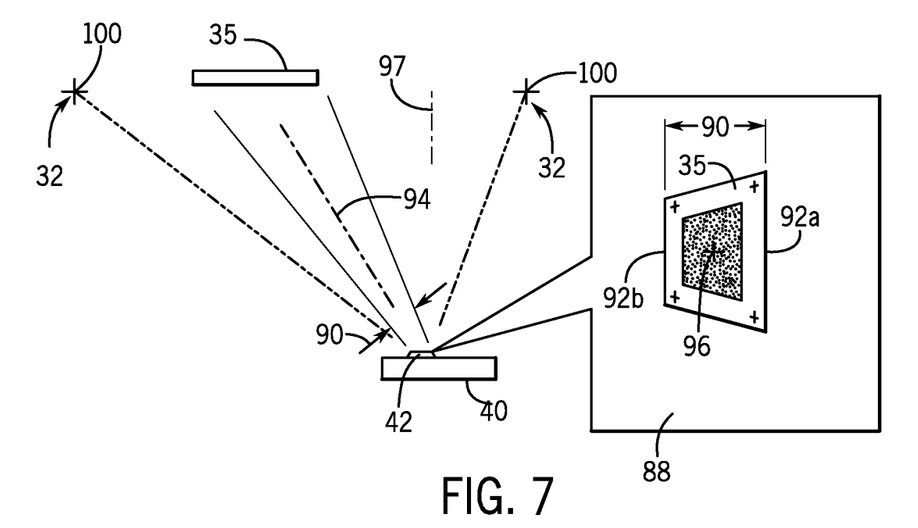
FIG. 7 is a diagrammatic representation of determining a fine location and orientation of the mobile device of FIG. 1 using a fiducial marker card.

Referring briefly to FIG. 7, this tracking process may operate on an image of the fiducial marker 35 and may determine a pixel width 90 of that image 88 to deduce an approximate separation between the mobile device 40 and the fiducial marker 35. The position of the center 96 of the fiducial marker 35 within the image 88 reveals relative angle 94 between the mobile device 40 and the fiducial marker 35 and further establishes the angle between the imaging center line of the camera 42 and the fiducial marker 35. An absolute location of the mobile device 40 in three space may then be obtained by determining the orientation of the face of the fiducial marker 35 relative to the orientation of the camera center of view 97 by evaluating foreshortening in the image 88 of the fiducial marker 35, for example, by comparing edge dimension 92a of the fiducial marker 35 to edge dimension 92b.

It will be appreciated that other location identification techniques can be used to determine a location of the mobile device 40 with respect to the fiducial marker 35 including combinations of the above and dead reckoning using an internal compass and accelerometer of the mobile device or other location and orientation determining system such as those used in virtual reality devices.

Knowledge of the location of the mobile device 40 and its orientation with respect to the fiducial marker 35 allows positions 100 of the lockout tags relative to the mobile device 40 to be determined from the location information in the database 72. In this respect, the position stored in the database 72 may be relative to the location of the fiducial marker 35.

Figure 4:
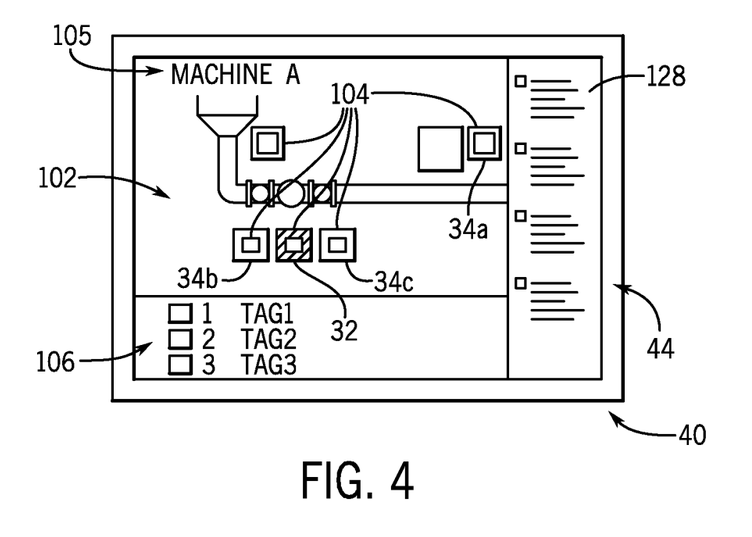
FIG. 4 is a screen display of the mobile device of FIG. 1 showing an image of the machine with lockout tags, the image having superimposed tag locations and a virtualized procedure tag and checklist for completing the steps of the procedure tag during a lockout procedure.

Referring now to FIGS. 3 and 4, at process block 87, the display 44 of the mobile device 40, for example, may provide an actual image 102 of the manufacturing equipment 12 taken in real time by the mobile device 40 having superimposed bounding boxes 104 highlighting in augmented reality a location of each of the procedure tags 32 and task tags 34 and the fiducial marker 35 using the technique described above. The bounding box 104 for the procedure tag 32 may be distinctively highlighted to allow the user to identify the procedure tag as a starting point for a lockout. This display 44 may also indicate identification 105 of the particular manufacturing equipment 12 for visual confirmation by the operator, giving an ID number and possibly an associated name of the manufacturing equipment 12 as can be stored in the tables 73. A checklist 106 of each tag is also provided to assist in the auditing and/or lockout generated by listing all of the lockout tags under the particular machine row in the database 72.

Referring now to FIGS. 1, 2 and 3, at process block 108, for both auditing and lockout execution, the user 43 is instructed by the program 50 per display 44 to sequentially move to each of the procedure tags 32 and task tags 34 to obtain images of those lockout tags starting with the procedure tags 32. As the user 43 moves toward the locations of the lockout tags, the camera 42 remains engaged to track movement of the mobile device 40, and at process block 110 that location is used to index within the database within the lockout tag that the user 43 is approaching.

At each lockout tag, user 43 may capture an image of the particular lockout tag which is compared to the image or text data of database field 74g of table 73 at process block 112. This comparison provides a measure of matching between the real-time acquired image through the camera 42 and the database pristine image when the two images are corrected to each other to remove variations of differing geometric transformations including translation, rotation, and scaling (affine transformation) as well as projective transformations (keystone distortions). One technique for such a comparison does a normalized correlation or looks for mutual information at various image transformations. It will be appreciated that other matching techniques including those employing supervised machine learning may be adopted.

When this matching process is used on a procedure tag 32 having text instructions for the lockout procedure, the image of the procedure tag 32 taken by the camera 42 may be first subject to optical character recognition (OCR) and that OCR text used to compare to a text version of the procedure that may be stored in the database. This can facilitate updating procedures without the need to obtain new images and can assess readability of the process tag. Alternatively, a simple correlation process or other pixel matching process can be employed as discussed above.

The result of this comparison process of process block 112 provides a similarity measure varying over a continuous range. This similarity measure may be compared to predetermined thresholds at decision block 114 to provide one of several values pending on the similarity measure. For example, a match may be considered to have occurred if the similarity measure is above a predetermined empirically determined value. For the procedure tags 32, that empirical value may be set to detect a single word of difference between the instructions of the imaged procedure tag 32 and the data of the field 74E so as to ensure a complete matching of the texts of these documents. Otherwise a similarly precise pixel matching may be demanded.

If the similarity value is below this predetermined "match," the value may be further analyzed to determine whether the similarity value is indicative of an erroneous lockout tag or simply a lockout tag that has been degraded, for example, by wear or obscuring dirt as will be discussed below.

If there is a match per decision block 114, then the audit data of field 74f is updated with the current date and time per process block 116 and an audit of this lockout tag is considered to have been completed. During the auditing procedure, the checklist 106 (shown in FIG. 4) is updated per process block 118 to check that particular checkbox associated with the given tag procedure tag 32 and task tags 34 to indicate that auditing has been completed. When the program 50 is being used for a lockout procedure, a checkbox associated with a procedure tag 32 is automatically checked, but checkboxes associated with task tags 34 are only checked after a tag matching has been determined and the user 43 has confirmed the task associated with this task tag 34 per the instructions of the procedure tag 32 has been completed.

At decision block 120, a determination has been made as to whether all of the lockout tags on the given machine have been imaged and matched (each checkbox is checked) and if so, at decision block 122, if the program 50 is performing an audit, the database 74 is checked to see if there are other pieces of manufacturing equipment 12 that require auditing—for example, by comparing fields 74e and 74f to see if any of the dates of last audit are within the predetermined range of the most recent audit. This range may be adjusted by the user, for example, to ensure that every tag is audited on a periodic basis within a certain time window.

If at decision block 120 not all of the lockout tags have been audited (for auditing) or have had their lockout instructions performed (for lockout procedure), the program 50 loops back to the top of process block 86 to obtain an image of the next lockout tag and for the user 43 to confirm that the task associated with any task tag 34 has been completed.

If at decision block 122 the program is used for auditing and not all of the audited tags have been audited, the program loops back to process block 82.

When the program 50 is being used for a lockout procedure implementation (while also collecting auditing data) at process block 87, once the procedure tag 32 has been captured with the camera 42, the display 44 may provide a side panel 128 (shown in FIG. 4 and per process block 130 of FIG. 3) indicating the steps that need to be conducted for a lockout. These steps are presented in order with a particular step associated with a particular lockout tag being highlighted. This display allows lockout procedures with greater safety even when a relevant procedure tag 32 is partially obscured or obsolete.

At process block 108, the user 43 may mark a given tag as missing as an alternative to providing an image per process block 131. This allows the auditing process to continue when no image can be obtained because there is no lockout tag. The relevant tag is indicated in the checklist and marked as missing.

When the program 50 is implementing a lockout, once decision block 120 indicates that all the tags have been successfully completed (imaged and the necessary steps of the tasks associated with task tags 34 performed), the completion of that lockout event is stored in the database per process block 132. The stored data may indicate either that the manufacturing equipment 12 has been locked out or has been released from lockout in which the steps of the procedure tag 32 are performed in reverse order.

In both uses of the program 50 for auditing and auditing/lockout, the program then exits at process block 134.

Referring again to decision block 114, in the event that the images obtained and the images in the database 72 do not match the predetermined threshold indicating an acceptable matching for the purpose of auditing or lockout, the program 50 moves to decision block 140 to determine whether the program 50 is being used for auditing or lockout. If only auditing is indicated, then the program 50 moves to process block 142, and any mismatch is qualified with respect to whether the mismatch indicates a need to replace the lockout tag (meaning that the lockout tag has some degradation and should be replaced but is still readable with reasonable reliability) or that the lockout tag must be replaced as unreadable. This distinction is stored in fields 74i. At this step, the user 43 may also annotate the report by adding comments or characterizations of the mismatch without removing existing audit data.

At process block 142, the user 43 may also be advised if the lockout tag is in the wrong location or if an incorrect lockout tag is at a correct location for a different lockout tag of that piece of manufacturing equipment 12. In this case, the user 43 may be advised as to the proper location for the incorrect lockout tag if there is such a location at that manufacturing equipment 12 thereby facilitating field-level correction of possible lockout tag problems.

Figure 6:
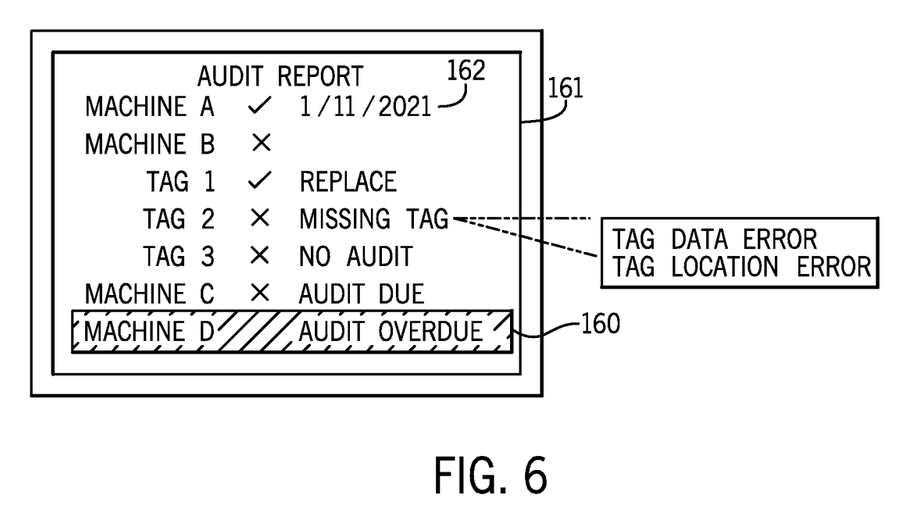
FIG. 6 is an example report generated by the present invention from the audit information.

Referring to FIG. 6, the information from the audit log of fields 74e, 74f, and 74i may be used to generate an audit report 161, for example, printed out or displayed on terminal 75 (shown in FIG. 1), listing each piece of manufacturing equipment 12 and its associated lockout tags and indicating whether they have been successfully audited (indicated by a checkmark or not). In the case where the manufacturing equipment 12 is successfully audited with all of its tags, only the identification of the particular manufacturing equipment 12 and the date of audit may be shown (together with the fact that the audit is complete).

The report 161 may also indicate whether each piece of manufacturing equipment 12 has been audited within a predetermined time or is shortly due for auditing according to a predetermined number of days or months before an audit due date or whether it is overdue for an audit. These latter pieces of manufacturing equipment 12 may be flagged, for example, with special highlighting 160. For the manufacturing equipment 12 that is in compliance, an audit date 162 may be provided. All audit data may be used, for example, to generate a list of required auditing tasks for a user 43 including, for example, determining a shortest path between machines based on machine locations in a table associated with the database 72.

When a particular piece of manufacturing equipment 12 has not been fully audited but some of its lockout tags have been audited, those lockout tags may be listed individually and the state of the lockout tags indicated as either requiring replacement (per process block 142) or being missing, or not yet having an audit conducted, the latter as may be determined by the fact that the location of the particular lockout tag was never approached. Additional indications may be given with respect to whether a tag data is erroneous or whether the tag location is erroneous. This report 161 may also indicate those pieces of manufacturing equipment 12 where an audit is due (for example, being within a certain time before a desired periodicity of auditing) or that an audit is overdue which may be highlighted as being cases where there has been no audit for their desired interval.

Figure 5:
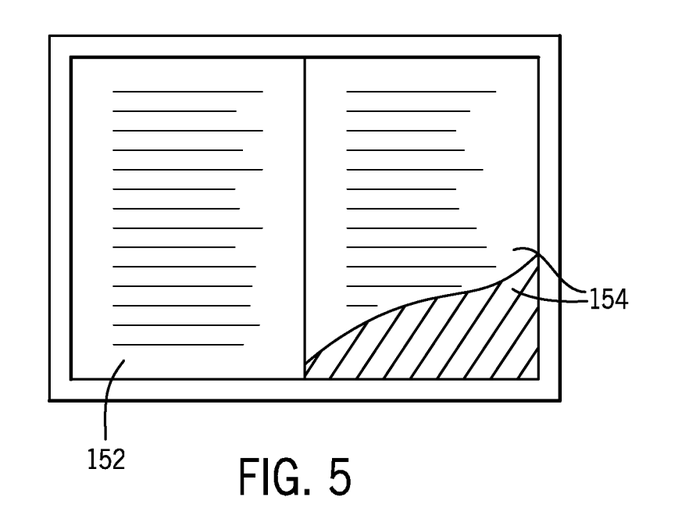
FIG. 5 is a screenshot similar to that of FIG. 4 showing a display of a procedure tag on the machine and a stored procedure tag image for visual comparison by the user during lockout procedures.

Referring again to FIG. 3 in the event at decision block 140 that an audit is not being performed but instead program 50 is being used for a lockout procedure (having auxiliary auditing activities), the severity of the mismatch at decision block 114 may be assessed by the individual per decision block 150. Referring also to FIG. 5, that assessment may provide the user 43 with a comparison between an image 152 from the camera 42 and the image 154 of field 74g for side-by-side inspection. The user 43 may then determine whether the tags are sufficiently legible and accurate to permit lockout, and the user 43 may override the mismatch process returning the program to process block 142 where a report is generated of the user's override but the program 50 is allowed to continue operation of the lockout procedure.

If at decision block 150, the user 43 considers the lockout tag to be unacceptably degraded, then at process block 153, the lockout process is stopped and the report 161 generated indicating that lockout was not possible and thus may require immediate attention. The information in the 161 may also be sent to specific individuals, for example, by email or other messaging system for immediate response.

It will be appreciated that the present system may provide a machine-assisted implementation of lockout operations of lockout and lockout removal as well as providing concurrent auditing or individual auditing of those systems with the benefit of machine comparisons of the tags such as can catch errors in location or tag numbering or instructions that may not be recognized by an auditor.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. AU of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What I claim is:

1. An apparatus for a lockout tag confirmation comprising:
   a mobile unit adapted for portable operation by a user, the mobile unit holding a camera; and
   an electronic computer holding a database of database data identifying a plurality of lockout tags and linked to audit information, wherein:
   each of the plurality of lockout tags include either a procedure tag or a task tag, wherein both the procedure tag and the task tag describe at least one step of a lockout procedure,
   the database data includes a location for each of the plurality of lockout tags;
   the audit information includes data verifying the presence of each of the plurality of lockout tags at the location stored in the database data, and
   the electronic computer is adapted to communicate with the mobile unit and to execute a program stored in electronic computer memory to:
   (a) receive a camera image of a given lockout tag from the camera and compare data of the camera image to the database data to determine a matching value indicating a matching between the camera image and the database data; and
   (b) after determining the matching value, update the audit information of the database linked to the database data to indicate an auditing of the given lockout tag.

2. The apparatus of claim 1 wherein the audit information indicates a date of the updating of the audit information.

3. The apparatus of claim 1 wherein the comparison determines a multivalued matching value indicating through different values: a likely erroneous lockout tag, a likely correct lockout tag, and a likely correct lockout tag that is partially obscured and needs replacement, and wherein the audit information distinguishes among these different values.

4. The apparatus of claim 1 wherein the mobile device includes a means for sensing location of the camera image and communicating with the electronic computer, and wherein the electronic computer further provides audit information indicating that the location of the given lockout tag in the camera image deviates by more than a predetermined amount from the location in the database matching the given lockout tag.

5. The apparatus of claim 4 wherein the database further organizes the database data by a machine group indicating a machine with which the given lockout tag is associated, and wherein the electronic computer further includes output information indicating a matching of the given lockout tag with a lockout tag in a different location but associated with the machine group of the given lockout tag.

6. The apparatus of claim 1 wherein the database organizes the database data by machine group and wherein the electronic computer further provides a checklist display indicating lockout tags associated with a given machine and showing lockout tags where a camera image has been received for determining a matching value.

7. The apparatus of claim 6 wherein the mobile device provides a user input and the electronic computer operates to receive user input that a given lockout tag on the checklist is missing and wherein the audit information is updated to indicate that the given lockout tag is missing.

8. The apparatus of claim 1 wherein the mobile device provides a display and the electronic computer further operates to provide a notification output to the user on the display of results of the matching.

9. The apparatus of claim 1 wherein the mobile device further includes a display for displaying the image from the camera and a means for sensing location of the camera image, both communicating with the electronic computer; wherein the electronic computer further operates to display an image from the camera on the display with markings in the image indicating a location of the given lockout tag in the image based on the location for one of the plurality of lockout tags in the database data matching the given lockout tag.

10. The apparatus of claim 9 wherein the database further holds data distinguishing between the procedure tag providing instructions for lockout referencing other task tags, and the task tags; and wherein the markings visually distinguish between the procedure tag and the task tags.

11. The apparatus of claim 9 wherein the means for sensing location of the camera image extracts location information from a camera image of a fiducial marker fixed with respect to a machine associated with lockout tags of the database.

12. The apparatus of claim 11 wherein the fiducial marker further identifies the machine associated with lockout tags of the database and the database organizes the database data according to machine; and wherein the identification of a machine from the fiducial marker is used to index the database.

13. The apparatus of claim 1 wherein the procedure tag provides instructions for lockout referencing other lockout tags and wherein the electronic computer is further adapted to determine a nonmatching when at least one word of the instructions is different.

14. The apparatus of claim 1 wherein the mobile device includes a display and a user input, and when the camera image of a lockout tag provides instructions for a lockout procedure tag referencing other lockout tags, displays a checklist indicating steps of the instructions, receiving user input to check off those steps and indicate when all of the steps have been checked off by the user.

15. The apparatus of claim 1 further including a display communicating with the electronic computer and wherein the electronic computer operates to display the database data of the procedure tag together with the camera image for comparison by the user.

16. The apparatus of claim 1 wherein the step of comparing data of the camera image to data of a database data performs optical character recognition on the camera image to compare characters of the camera image to character string database data.

17. The apparatus of claim 1 wherein the step of comparing data of the camera image to the database data compares a correlation between pixels of the camera image and pixels of an image of the database data corrected for positional and rotational differences between these images.

18. The apparatus of claim 1 wherein the mobile device provides an input for an operator to annotate the predetermined matching value and wherein the audit information includes both the predetermined matching value and annotation and an identification of the user.

19. The apparatus of claim 1 wherein electronic computer further operates to output a report identifying lockout tags that have not received camera images of a given lockout tag within a predetermined time limit of a previously received camera image for the given lockout tag.

20. The apparatus of claim 19 wherein the report distinguishes between categories of missing lockout tags, lockout tags with erroneous data, and lockout tags that need to be replaced but have correct data.

21. A factory system comprising:
- a machine providing an energy supply controllable by a first operator and a source of stored energy controllable by a second operator, the machine holding a procedure tag describing a lockout procedure and the first and second operators holding task tags indicating a task being part of the lockout procedure;
- a mobile unit adapted for portable operation by a user, the mobile unit holding a camera; and
- an electronic computer holding a database of database data identifying a plurality of lockout tags and linked to audit information, wherein:
- the plurality of lockout tags includes the procedure tag and the task tags,
- the database data includes a location for each of the plurality of lockout tags;
- the audit information includes data verifying the presence of each of the plurality of lockout tags at the location stored in the database data, and
- the electronic computer is adapted to communicate with the mobile unit and to execute a program stored in electronic computer memory to:
- (a) receive a camera image of a lockout tag of the machine from the camera and compare data of the camera image to the database data to determine a matching value indicating a matching between the camera image and the database data; and
- (b) after determining the matching value, updating the audit information of the database linked to the database data to indicate an auditing of the given lockout tag.

* * * * *